United States Patent [19]

Peterson

[11] 4,047,368
[45] Sept. 13, 1977

[54] ATTACHMENT FOR COLLECTING MOWER DISCHARGE IN A PLURALITY OF BAGS

[75] Inventor: James F. Peterson, Cedarburg, Wis.

[73] Assignee: Allis-Chalmers Corporation, Milwaukee, Wis.

[21] Appl. No.: 709,871

[22] Filed: July 29, 1976

Related U.S. Application Data

[63] Continuation of Ser. No. 559,968, March 19, 1975, abandoned.

[51] Int. Cl.² ............................................. A01D 35/22
[52] U.S. Cl. ...................................... 56/202; 56/320.2
[58] Field of Search ...................... 56/202, 13.3, 13.4, 56/320.2; 248/95, 99, 101

[56] References Cited

U.S. PATENT DOCUMENTS

| | | | |
|---|---|---|---|
| 3,186,667 | 6/1965 | Mever | 248/99 X |
| 3,199,277 | 8/1965 | Moody | 56/202 X |
| 3,624,989 | 12/1971 | Gatheridge | 56/202 |
| 3,657,865 | 4/1972 | Ober | 56/320.2 X |
| 3,716,977 | 2/1973 | Jackson | 56/202 |
| 3,722,192 | 3/1973 | Corbett | 56/202 |
| 3,893,615 | 7/1975 | Johnson | 248/99 X |
| 3,974,631 | 8/1976 | Rhodes | 56/202 |

Primary Examiner—Jay N. Eskovitz
Attorney, Agent, or Firm—Charles L. Schwab

[57] ABSTRACT

A riding type mower is provided with a grass catcher attachment having removable container and cover structures. The container structure includes a horizontally disposed quadrilateral frame carrying a large container. The cover structure includes a molded cover and a screen extending downwardly from the cover with resilient clips or latches at the lower edge adapted to snap onto the container frame. A discharge chute from the mower directs the cut material rearwardly to a blower mounted on the rear of the mower. The blower discharge directs the cut grass upwardly toward a deflector formed by the shape of the top of the cover. The user may use the container to catch cut grass or may at his option place three plastic bags, such as garbage can liner bags, in lateral side-by-side relationship inside the container. The plastic bags are held in place by four spring loaded retainers and by the clips which hold the cover structure onto the container frame. The container has tapered front and rear sides to facilitate upward removal of the plastic bags therefrom.

12 Claims, 6 Drawing Figures

ATTACHMENT FOR COLLECTING MOWER DISCHARGE IN A PLURALITY OF BAGS

This is a continuation, of application Ser. No. 559,968 filed Mar. 19, 1975, now abandoned.

BACKGROUND OF THE INVENTION

Heretofore, others have provided grass catchers which include flexible clothlike or plastic bags into which the cut material is thrown by action of the mower blades or by powered fans. It has heretofore been suggested that a removable bag such as a garbage can liner be placed inside of a grass catcher. However, these prior art suggestions have not been entirely satisfactory in that they suggest either a single disposable bag which if removable by a single person requires frequent stopping for emptying the bag or so large a bag that it is difficult for one person to manually remove the bag. It has also been found that the usual commercially available large size plastic bags when filled with grass clippings will tend to rip when an attempt is made to move them. This latter problem is most critical when the clippings have high moisture content. The use of an extra heavy duty disposable plastic bag is not only excessively expensive but, when filled with high moisture grass clippings, it is so heavy that most users cannot remove it from the grass catcher without assistance.

BRIEF DESCRIPTION OF THE INVENTION

The present invention contemplates the use of a plurality of removable, disposable bags in side-by-side lateral relationship in a relatively large container whereby a significant quantity of cut material can be accumulated before it is required to stop mowing and remove the bags. The bags are not so large so as to make it difficult to remove them one at a time from the grass catcher. The container has upwardly diverging front and rear walls to make it easy to remove the plastic bags. A screen extending downwardly from the cover permits air to escape while trapping the cut material in the grass catcher. The cover and screen structure is readily removable by virtue of its being held in place on the container frame by a plurality of spring clips. The removable bags disposed within the grass catcher container have their open upper ends draped over the container frame and are held in place by four spring biased retainers mounted on the frame together with the spring clips which hold the cover structure on the frame.

It is a primary object of the present invention to provide a grass catcher adaped to receive a plurality of removable bags whereby a significant quantity of grass can but cut before the operator is required to stop to unload and the unloading of the cut material is facilitated by having it deposited in a plurality of bags of a size that permits removal by one person. It is contemplated that the removable bags utilized for this purpose will be inexpensive, commercially available plastic bags such as plastic garbage can liners and trash bags.

DETAILED DESCRIPTION OF THE INVENTION

Figure 1:
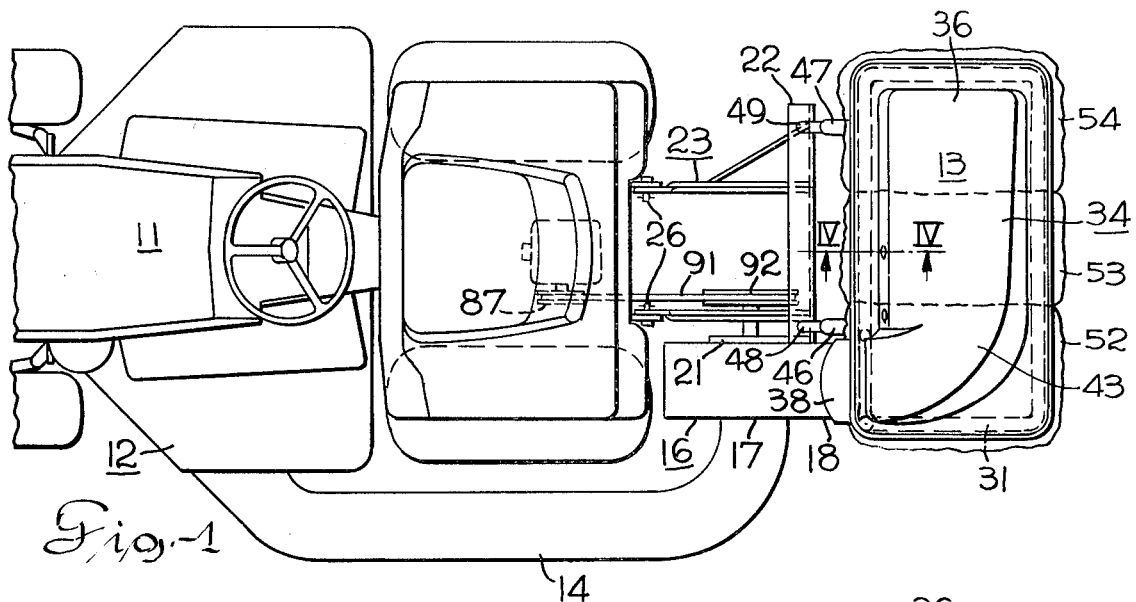
FIG. 1 is a top view of a riding tractor with a grass catcher attachment incorporating the present invention.
Figure 2:
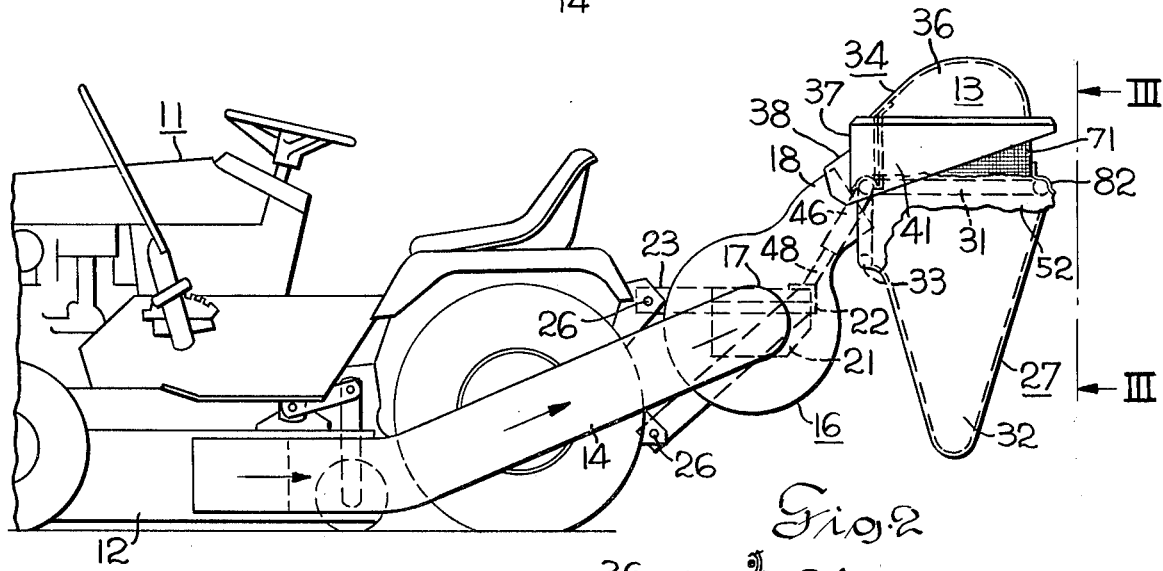
FIG. 2 is a side view of the tractor shown in FIG. 1.

Referring to FIGS. 1 and 2, a lawn and garden tractor 11 is illustrated with a mower attachment 12 and a grass catcher attachment 13. The rotary blades, not shown, of the mower attachment 12 discharge the cut material into a discharge tube 14 and a blower 16 pulls the cut material into its intake 17 and discharges the material through its outlet conduit 18 into the grass catcher attachment 13. The housing of the blower 16 is secured to a vertical plate 21 welded to and angle 22 of an attachment frame 23 which is releasably connected to the rear of the tractor by appropriate releasable fastening pins 26.

Referring also to the other figures of the drawings, the grass catcher attachment 13 includes a container structure 27 and a cover structure 34. The container structure 27 includes a generally horizontally disposed tubular frame 31 to which a container 32 is attached. The container 32 has upwardly diverging front and rear walls which facilitate removal of plastic bags which may optionally be used in the container. The quadrilateral frame 31 includes a U-shaped downwardly extending portion 33 which passes beneath the outlet conduit 18 of the blower 16. The cover structure 34 includes and impervious molded plastic cover 36 with a dust skirt 37 extending downwardly at the rear which includes a hoodlike indentation 38 for accommodating the outlet conduit 18 of the blower 16. The dust skirt 37 includes tapered side portions 41, 42. The top of the cover 36 includes a deflector chute 43 which serves to deflect the discharge from the blower in a manner spreading the material across the lateral width of the container structure 27. The container frame 31 includes a pair of forwardly and downwardly extending tube portions 46, 47 which fit in telescoping relation to a pair of cylindrical members 48, 49 welded to angle 22 and extending upwardly and rearwardly therefrom. The container frame 31 is thus removably supported on the attachment frame 23.

Figures 3, 4, 5, 6:
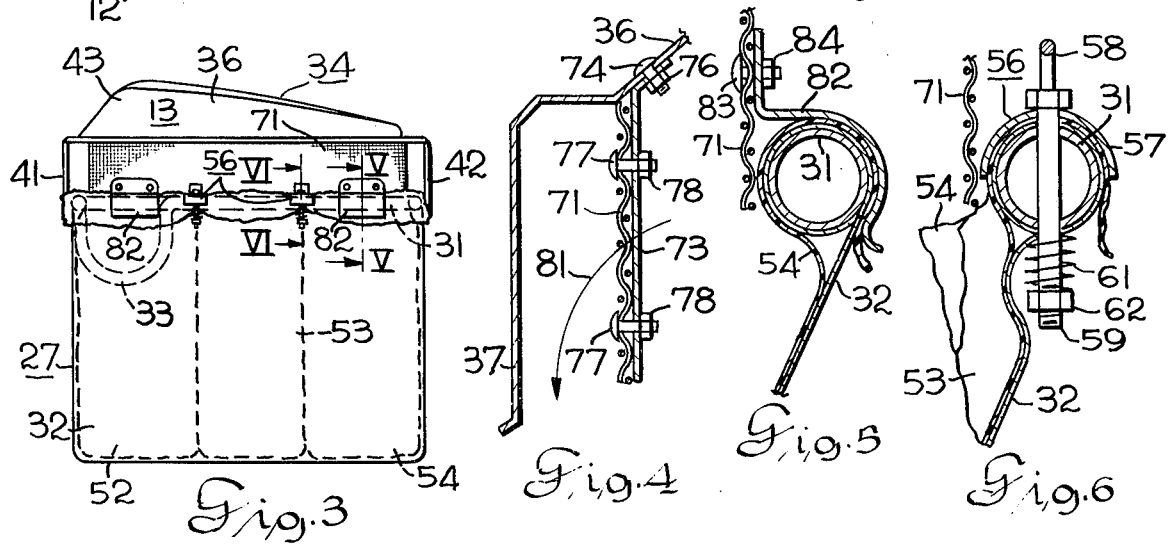
FIG. 3 is a section view taken along the line III—III in FIG. 2.
FIG. 4 is a section view taken along the line IV—IV in FIG. 1.
FIG. 5 is a section view taken along the line V—V in FIG. 3.
FIG. 6 is a section view taken along the line VI—VI in FIG. 3.

In order to make it easy to unload clippings from the grass catcher attachment, three plastic trash can liner bags 52, 53, 54 are placed inside the container 32 and have their upper open ends draped over the frame 31 where adjacent corners of the bags are held in place by four spring loaded retainers 56. As shown in FIG. 6, each retainer 56 includes a U-shaped part 57 which is complementary to the shape of the tube members of frame 31, a finger grip portion 58, a downwardly extending bolt 59, a coil compression spring 61 surrounding the bolt 59 and a nut 62 on the threaded end of the bolt 59. As illustrated in FIG. 6, the spring loaded releasable retainer 56 is releasably holding adjacent upper edge portions of bags 53, 54 on the container structure 27.

The cover structure 34 has downwardly extending walls in the form of a boxlike screen 71 which is fastened to the molded plastic cover 36 by a plurality of brackets, nuts and bolts. Referring to FIG. 4, it is seen that a narrow strap 73 is fastened to the cover 36 by a bolt 74 and nut 76. The downwardly extending section of the strap 73 is connected to the screen 71 by a pair of bolts 77 and nuts 78. It will be noted in FIG. 4 that the dust shield 37 of the cover 36 is spaced longitudinally forward of the screen 71 a sufficient distance to permit passage of air from the inside of the cover as indicated by the arrow 81. It will also be noted in FIG. 3 that the sides 41, 42 of the dust shield 37 are spaced laterally from the screen 71 to permit air to freely flow through the screen to the outside of the cover structure 34.

The cover structure 34 is releasably held in place on the container structure 27 by a plurality of spring clips or latches 82 which are secured to the screen 71 by bolts 83 and nuts 84. As illustrated in FIGS. 3 and 5, the clips 82 also serve to hold the plastic bags 52, 54 in place on the container structure 27.

During operation, the blower 16, whose pulley 92 is connected to a power take off pulley 87 through a V-belt 91, sucks the material delivered by the mower blades to conduit 14 into the blower housing from whence it is centrifugally blown or thrown into the discharge conduit 18 which delivers the material to the grass catcher attachment 13. The top wall or deflector 43 of the cover 36 is spaced a substantial vertical distance above the top of the bags 52, 53, 54 so that adequate space is provided for movement of clippings into the bags. Inasmuch as the plastic bags 52, 53, 54 are impervious, some means must be provided to permit the escape of air and this is achieved through the provision of the boxlike screen which is complementary in shape to the rectangular configuration of the frame 31. Material discharged by the blower 16 is deflected by the deflector 43 in the plastic cover 36 so as to fill all of three bags more or less simultaneously. In most grass cutting operations the bag 54 will fill first, then bags 53 and 52 will fill in that order. While bag 54 is filling the bags 53 and 52 are also receiving a substantial amount of cut material. The weight of the bags 52, 53, 54 is supported by the container 32 rather than retainers 56 or clips 82, thus avoiding ripping of the plastic bags. When the bags are filled, the operator removes the cover 36 by pulling it upwardly and then the removable bags 52, 53, 54 are released from the retainers 56 by pulling upwardly on the finger holds 58 and removing the top lip of the bags from thereunder. The average housewife and relatively small persons can easily handle the emptying of the grass catcher and if desired, the bags may be placed on the lawn at the point of unloading and the cutting operation continued. Later, the bags may be picked up in any manner desired and taken to the point of disposal. Also, if desired, the operator can drive the tractor with the filled bags to a point of disposal. By using three small to medium size disposable plastic bags the normal weight of cut grass in a substantially filled bag will not be too heavy for a small person to lift and the risk of ripping the bag during handling is minimized. The grass catcher of this invention is so designed as to permit the user to optionally use plastic bags without any requirement for conversion equipment. If the plastic bags are omitted the container 32 serves as a receptacle for the cut material.

The container 32 may be made of relatively rigid material such as molded plastic or it may be made of fabric or cloth. In either case the tapered front and rear walls of the container 32 prevent jamming of the bags in the container. The bags 52, 53, 54 when filled will tend to bulge horizontally. If the container walls were vertical it would be difficult to move the bags upwardly past the rigid frame 31. As the bags 52, 53, 54 fill with cut material their weight is supported by the containers 32 rather than by the retainers 56 or clips 82. If the plastic bags were supported only by their upper edges they would be more likely to rip or tear when filled with heavy material and transported over uneven terrain.

The embodiments of the invention in which an exclusive property or privilege is claimed as defined as follows:

1. A grass catcher attachment for a lawn mower comprising:
   a container structure adapted for mounting on said mower, said container being open at its upper end,
   a plurality of flexible bags removably positioned in said container structure in lateral side-by-side relation to one another and with their upper ends open,
   a cover structure releasably secured to said upper end of said container structure with an impervious top wall in vertically spaced overlying relation to said open bags and a screen in a rear of said cover structure permitting discharge of air from said grass catcher, and
   means defining an opening in said attachment adapted to receive a single mower discharge conduit directing mower discharge into the space between the upper open ends of said bags and said top wall of said cover structure whereby said plurality of bags simultaneously receive mower discharge.

2. The attachment of claim 1 and further comprising an attachment frame adapted for releasably mounted on the rear of said mower, a blower on said attachment frame adapted for connection in receiving relation to a mower discharge and connected in delivering relation to said grass catcher attachment and wherein said container structure is mounted on said attachment frame.

3. The attachment of claim 1 wherein said cover structure includes a rigid cover and a screen extending downwardly from said cover at the front, rear and sides thereof.

4. The attachment of claim 3 and further comprising latch means secured to the lower end of said screen and releasably engaging said container structure.

5. The attachment of claim 4 wherein said container structure includes a horizontally disposed quadrilateral frame at the upper edge thereof and said latch means include spring clips cooperatively engaging said frame.

6. The attachment of claim 5 wherein the upper ends of said flexible bags are draped over said frame and are held in place by said clips.

7. The attachment of claim 6 and further comprising spring biased retainers on said frame releasably securing adjacent upper end portions of said bags to said frame.

8. The attachment of claim 1 wherein the upper ends of said bags are draped over the upper edges of said container structure and further comprising latch means releasably securing said cover structure to said container structure and releasably maintaining said upper ends of said bags in place.

9. The attachment of claim 1 and further comprising spring biased retainers on said upper end of said container structure releasably securing said bags to said upper end of said container structure.

10. The attachment of claim 1 wherein said container structure includes upwardly diverging front and rear walls.

11. A grass catcher attachment for a lawn mower comprising:
    a container structure adapted for mounting on said mower, said container being open at its upper end, and having upwardly diverging front and rear walls, a plurality of bags in lateral side-by-side relationship in said container structure with their upper ends open, a cover structure releasably secured to said upper end of said container structure with an impervious top wall in vertically spaced overlying relation to said container and said open upper ends of said bags and having walls extending downwardly from the periphery of said top wall including a screen in its rear wall permitting escape of air, and means defining an opening in said attachment adapted to receive a single mower discharge conduit directing mower discharge into the space between the upper open ends of said bags and said top wall of said cover structure whereby said plurality of bags simultaneously receive mower discharge.

12. The grass catcher attachment of claim 11 and further comprising retainers for releasably securing adjacent portions of said bags to said container.

* * * * *